(12) United States Patent
Akopyan

(10) Patent No.: US 12,157,255 B1
(45) Date of Patent: Dec. 3, 2024

(54) SYSTEM AND METHOD FOR MOLDING STOCK SHAPES

(71) Applicant: Lev R. Akopyan, Olathe, KS (US)

(72) Inventor: Lev R. Akopyan, Olathe, KS (US)

( * ) Notice: Subject to any disclaimer, the term of this patent is extended or adjusted under 35 U.S.C. 154(b) by 547 days.

(21) Appl. No.: 17/105,051

(22) Filed: Nov. 25, 2020

Related U.S. Application Data

(60) Provisional application No. 62/940,456, filed on Nov. 26, 2019.

(51) Int. Cl.
*B29C 45/53* (2006.01)
*B29C 45/56* (2006.01)
*B29C 45/73* (2006.01)
*B29C 45/74* (2006.01)

(52) U.S. Cl.
CPC .............. *B29C 45/53* (2013.01); *B29C 45/56* (2013.01); *B29C 45/73* (2013.01); *B29C 45/74* (2013.01); *B29C 2045/5695* (2013.01)

(58) Field of Classification Search
CPC ......... B29C 45/56; B29C 45/74; B29C 45/78; B29C 45/36; B29C 45/62; B29C 45/24; B29C 45/1753; B29C 48/2715
See application file for complete search history.

(56) References Cited

U.S. PATENT DOCUMENTS

| | | | | |
|---|---|---|---|---|
| 4,071,532 A | * | 1/1978 | Rose | B29C 45/56 |
| | | | | 264/537 |
| 6,241,929 B1 | | 6/2001 | Akopyan | |
| 6,984,352 B1 | | 1/2006 | Akopyan | |
| 7,122,146 B2 | | 10/2006 | Akopyan | |
| 7,223,087 B2 | | 5/2007 | Akopyan | |
| 7,846,369 B2 | | 12/2010 | Akopyan | |
| 2005/0184434 A1 | * | 8/2005 | Akopyan | B29C 45/53 |
| | | | | 425/587 |
| 2008/0217815 A1 | * | 9/2008 | Akopyan | B29C 45/74 |
| | | | | 264/314 |
| 2009/0121375 A1 | * | 5/2009 | Okamoto | B29C 44/0461 |
| | | | | 264/46.4 |

FOREIGN PATENT DOCUMENTS

KR 20200030950 * 9/2018 ............. B29C 45/74

* cited by examiner

*Primary Examiner* — Emmanuel S Luk
*Assistant Examiner* — Debjani Roy
(74) *Attorney, Agent, or Firm* — AVEK IP, LLC; Kent R. Erickson

(57) ABSTRACT

A mold assembly comprises a mold sidewall surrounding a mold cavity. A material inlet passageway, through which plasticized material may be introduced into the mold cavity, is formed in an inlet end wall of the mold. A sliding core is mounted within the mold and advanceable between a seated position covering the inlet passageway and a retracted position spaced away from the inlet passageway to allow plasticized material to flow into the mold cavity. An annular plunger is slidably mounted on the sliding core and within the mold sidewall for applying a downward force on plasticized material introduced into the mold cavity. Fiber reinforcing inserts may be inserted into the mold prior to filling it with plasticized material and a source of Nitrogen gas is connected to an extruder for purging ambient air from the plastic material in the extruder prior to injection into the mold cavity.

10 Claims, 14 Drawing Sheets

SYSTEM AND METHOD FOR MOLDING STOCK SHAPES

CROSS-REFERENCE TO RELATED APPLICATIONS

This application claims the benefit of U.S. Provisional Patent Application No. 62/940,456, filed Nov. 26, 2019, the disclosure of which is hereby incorporated herein in its entirety by reference.

BACKGROUND OF THE INVENTION

Field of the Invention

This invention relates to systems and methods for molding items such as stock shapes from plastic materials having a relatively high melting point.

Description of the Related Art

U.S. Pat. No. 7,846,369 of Razmik Akopyan discloses apparatus and methods for forming molded polymer parts of relatively large cross-section and relatively thick-walled tubes by displacement injection molding. The molding system disclosed includes a plasticizing vessel to plasticize pellets to be injected into a variable volume mold. The variable volume mold includes moveable bottom wall or plunger slidable within a mold cavity. Molten plastic injected from the plasticizing vessel acts against back pressure on the mold plunger to move the plunger rearward, increasing the volume of the mold to its final, selected volume, such that molten plastic is injected into the mold cavity under pressure to prevent the formation of voids. Back pressure is applied to the mold by a hydraulic cylinder, which retracts to expand the mold cavity against the pressure exerted by the molten plastic injected into the mold. The portions of the mold forming the mold cavity are described as being heated to the injection temperature of the material injected therein.

Use of an additional hydraulic cylinder to apply back pressure to the moveable mold plunger increases the cost and complexity of the mold and slows the molding process. It has also been determined that improved extruders reduce the amount of voids formed in the molten thermoplastic injected into the mold cavity and any remaining voids can be removed or reduced by other means which do not require the additional equipment to apply back pressure.

There is also a need for a molding system which allows the placement of inserts in the mold cavity such as woven carbon fiber mesh layers which become impregnated with the thermoplastic material to form a higher strength composite material. Difficulties in trying to design a plunger and back pressure system which will allow the plunger to move past the inserts without dislodging or moving the inserts during the molding process indicate such an approach will be difficult to implement.

There is also a need for a molding process which allows long mold fill times at elevated temperatures. Due to the high melting point of advanced engineering polymers and long fill times needed to produce large cross-section parts, a process is needed which keeps the material from degrading. Oxygen, water vapor and carbon dioxide introduced into the mold cavity is reactive with the molten plastic, particularly at elevated temperatures and extended curing times, degrading the quality of the cured plastic in the molded part.

There remains a need for improved equipment and processes for forming relatively large cross-section parts and thick-walled tubular parts from plastic materials with a relatively high melting point which produces quality parts.

SUMMARY OF THE INVENTION

A molding system for forming a molded part comprises a mold having a mold sidewall surrounding a mold cavity. An inlet end wall of the mold extends across an inlet end of an outer wall of the mold. A material inlet passageway, through which plasticized material may be introduced into the mold cavity, is formed in the inlet end wall. A sliding core is mounted within the mold sidewall and slidable axially relative to the mold sidewall between a seated position and a retracted position. In the seated position, an inlet end of the sliding core is seated against the inlet end wall and across the material inlet passageway preventing molten thermoplastic from flowing into said mold cavity through the material inlet passageway. In the retracted position, the inlet end of the sliding core is spaced away from the inlet end wall allowing plasticized material to flow into said mold cavity through the material inlet passageway. An annular plunger, for applying a downward or compressive force on the plasticized material introduced into the mold cavity, is slidably mounted on the sliding core and within the mold sidewall.

A stop may be formed on the mold sidewall proximate the distal end thereof for engaging the sliding core when the sliding core is advanced to the retracted position to prevent the sliding core from advancing further axially relative to the mold sidewall. The stop may be formed as a shoulder extending inward from the mold sidewall in longitudinally spaced relation from the inlet end thereof. The annular plunger is positioned in the mold cavity between the inlet end wall and the shoulder and the shoulder prevents the plunger from advancing out of the mold cavity.

The mold cavity may be formed in two or more sections of differing dimensions, widths or diameters. As used herein, the diameter of a circle may also be referred to as its width. It is also to be understood that the cross-section of the mold cavity may comprise a variety of geometries. In one embodiment, an inner surface of the mold sidewall has a first diameter along an inlet section of the mold sidewall and a second diameter along a distal section of the mold sidewall. The plunger has an outer diameter that is slightly narrower than the second diameter along the distal section of the mold sidewall. The first diameter may be larger or smaller than the second diameter. In an embodiment where the distal section has a narrower diameter than the inlet section, the plunger includes an inner plunger section and an outer plunger section. The inner plunger section is positioned within the mold cavity around the axial core and has an outer diameter that is slightly narrower than the second diameter. The outer plunger section includes an axial bore extending therethrough and an outer diameter that is greater than the second diameter and slightly narrower than the first diameter. The outer plunger section has an inner diameter, along the axial bore, that is greater than the outer diameter of the inner plunger section such that the inner plunger section fits within the axial bore of the outer plunger section.

The present invention further includes a method of forming a molded part in which inserts formed from a material adapted to increase the tensile strength of the molded part are inserted into the mold cavity prior to introducing plasticized material therein. The inserts may be formed from woven, carbon-fiber mats. The method includes providing a mold having a mold sidewall surrounding a mold cavity, an inlet end wall extending across an inlet end of the outer wall, and an open end, opposite the inlet end wall, opening into the mold cavity. The mold provided may also include a core positioned in the mold cavity and a cover for covering the open end of the mold sidewall and surrounding the core. The inserts are inserted into the mold cavity through the open end thereof. The inserts may include a first sleeve having a shape corresponding to the shape of an inner surface of the mold sidewall. A second sleeve shaped insert may be positioned around the core. A first planar insert may be inserted against an inner surface of the inlet end wall and a second planar insert may be positioned against an inner surface of the cover.

After inserting the inner and outer sleeves and first planar insert into the mold cavity plasticized material is introduced into the mold cavity until the mold cavity is filled with plasticized material to an extent extending proximate the open end of the mold. The cover, sized to cover the open end of the mold cavity and preferably with an insert attached thereto is advanced over the open end of the mold cavity in covering relationship with the contents therein. A force, which may include gravity, may be applied to the cover to press the cover against the contents of the mold cavity to remove voids in the plasticized material contained therein. When filling the mold with inserts included, the plasticized material may be introduced into the mold cavity through a material inlet passageway in the mold sidewall near the open end or through the open end and the cover is applied after the mold cavity is filled to a selected level above the first and second sleeves. The cover may comprise a plunger having a cross-section, sized and shaped to correspond to the cross-section of the open end of the mold so that the plunger may extend at least partially into the open end of the mold.

In one preferred method, the core is slidable axially relative to the mold sidewall between a seated position in which an inlet end of the core is seated against an inner surface of the inlet end wall and across a material inlet passageway preventing molten thermoplastic from flowing into the mold cavity through the material inlet passageway and a retracted position in which the inlet end of the sliding core is spaced away from the inner surface of the inlet end wall allowing plasticized material to flow into said mold cavity through said material inlet passageway.

In another aspect of the invention, the plasticized material is introduced into the mold from an extruder having an outlet nozzle that is flow connected to the material inlet passageway of the mold. The extruder may be of a type having an extruder barrel with a bore extending therethrough in communication with the outlet nozzle. One or two screws within the barrel advance plastic feed material, typically in the form of pellets from a feed hopper to the outlet nozzle while heating and melting the plastic feed material. A source of the inert gas is flow connected to the extruder and selectively allowed to flow into the bore of the extruder to purge any ambient air therefrom to reduce the amount of ambient air introduced into the mold cavity with the plasticized material. Ambient air includes oxygen, carbon dioxide and water vapor which is reactive with the plasticized material, particularly at elevated temperatures and during the time needed for curing the molded parts. The gas comprises a gas that does not react with the plasticized material and a preferred gas comprises Nitrogen. It is foreseen that other inert gasses, such as an of the Noble gasses may also be used as the purging gas.

A source of the inert gas is preferably mounted on the extruder and flow connected to an outlet from a feed hopper for supplying the plastic material to the extruder barrel. The hopper is preferably sealed. The inert gas also functions to dry the material inside the hopper. After the material in the hopper reaches a desired dryness or dew point, a gate in the hopper outlet, downstream of the inert gas supply line, is opened and the dry and inert material falls into the extruder throat to be advanced toward the extruder nozzle by the screw or screws.

This process purges moisture and reactive gasses from the plastic material from the hopper, through the barrel and to the extruder nozzle. The process reduces degradation of the plastic in both the extruder and the mold. Not only is a better part quality achieved, but the entire system experiences less plastic degradation resulting in significantly less down time for cleaning of the extruder and the mold. Purging ambient air and water vapor from the plastic material introduced into the mold cavity allows for extended fill times and thus larger part sizes.

DETAILED DESCRIPTION OF THE PREFERRED EMBODIMENTS

Figure 1:
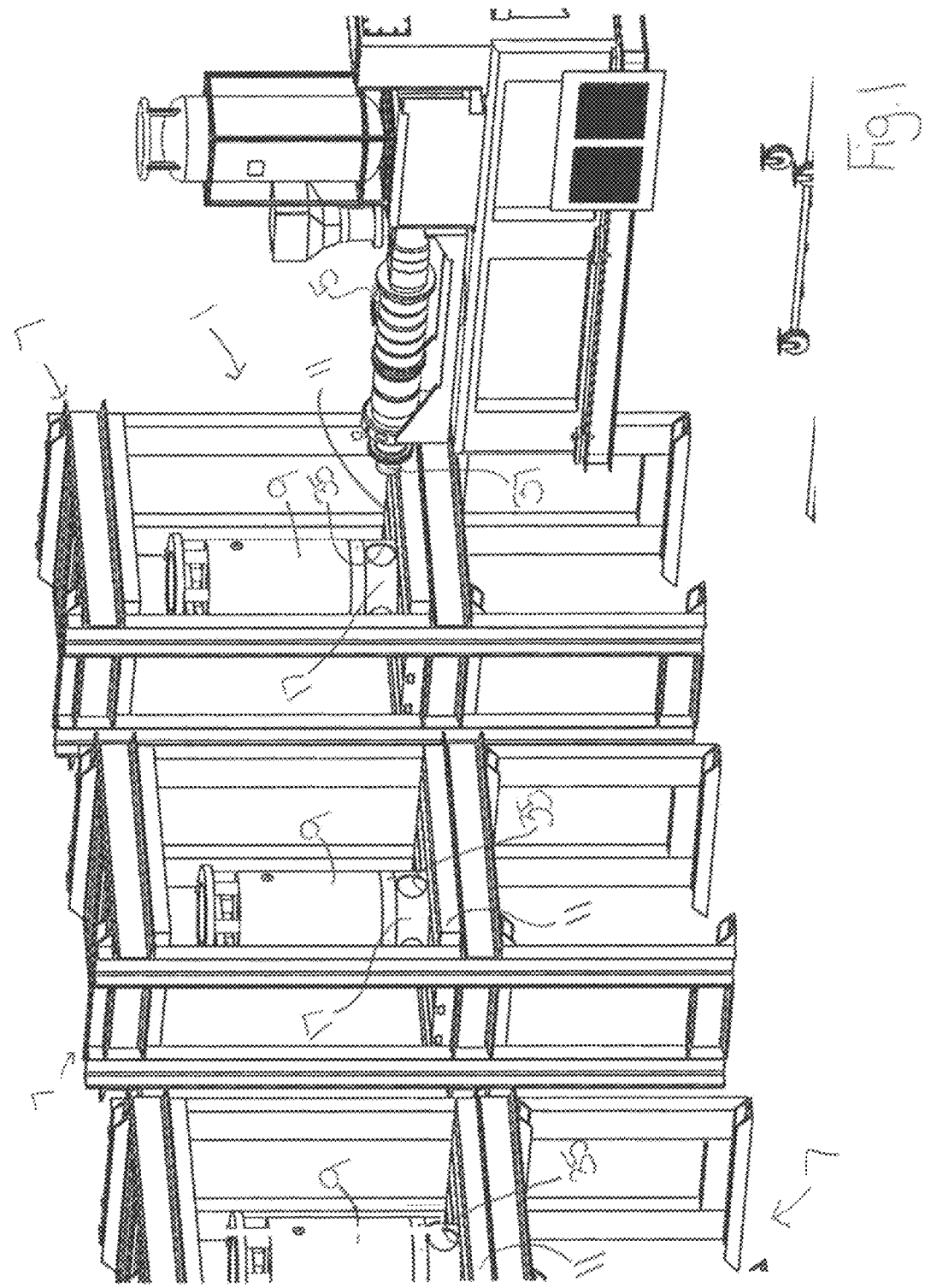
FIG. 1 is a perspective view of a molding system including an extruder and a plurality of molding presses with molds supported on a movable platen.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to FIG. 1, a molding system 1 is shown including an extruder 5 and a plurality of mold presses 7, each with a mold or mold assembly 9 supported on a moveable platen 11 below an upper stationary plate 13. The movable platen 11 is advanceable towards and away from the stationary platen 13 by an actuator, such as a hydraulic cylinder not shown. The mold is supported on a base 17 which is supported on moveable platen 11. The mold 9, as shown in FIGS. 2-8, includes a flange plate or inlet end wall 21, a sidewall 23 circumscribing a mold cavity 24, an axial core 25 extending axially within the mold cavity 24, an annular plunger 27 slidably mounted on the axial core 25, an annular top plate 29 and a core stop 31.

Figure 8:
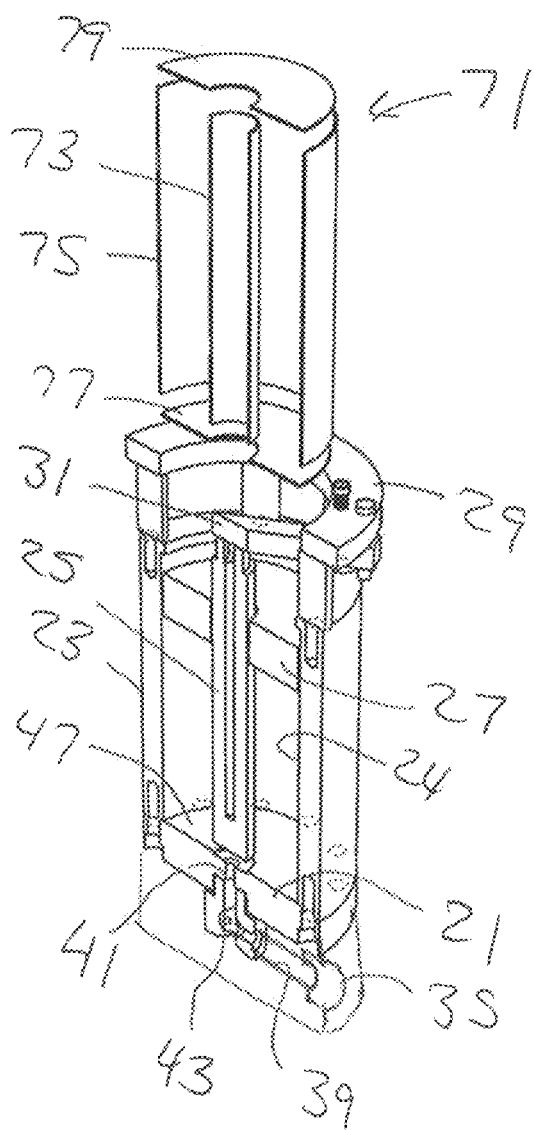
FIG. 8 is a view similar to FIG. 3 showing fragmentary portions of mold inserts to be inserted in the mold cavity prior to injection of plasticized material therein.

As best seen in FIG. 8, an inlet 35 is formed in the base 17 and in the embodiment shown, the inlet opens longitudinally for insertion of a nozzle 37 of the extruder 5 therein. An inlet passageway 39 extends from inlet 35 to the center of the base 17 and opens upward through an outlet opening 41. A valve 43 may be positioned in the base 17, in-line with the inlet passageway 39, to control the flow of extruded plastic from extruder 5 to mold 9. Outlet opening 41 in base 17 is aligned with and communicates with inlet 45 extending centrally and axially through the flange plate 21.

Figure 5:
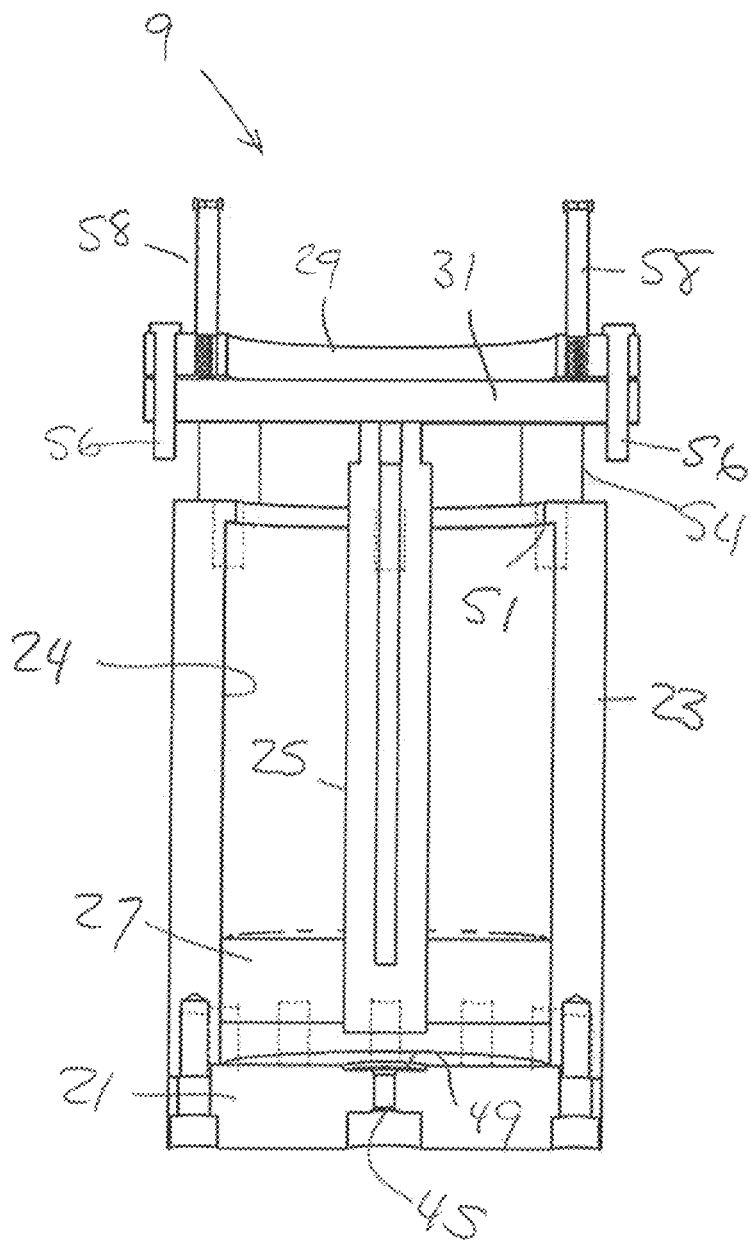
FIG. 5 is a view similar to FIG. 4 showing the axial core advanced upward and away from the flange plate and out of a recess formed therein such that plasticized material may flow from an inlet in the flange plate and past the axial core and into the mold cavity below the plunger.
Figure 6:
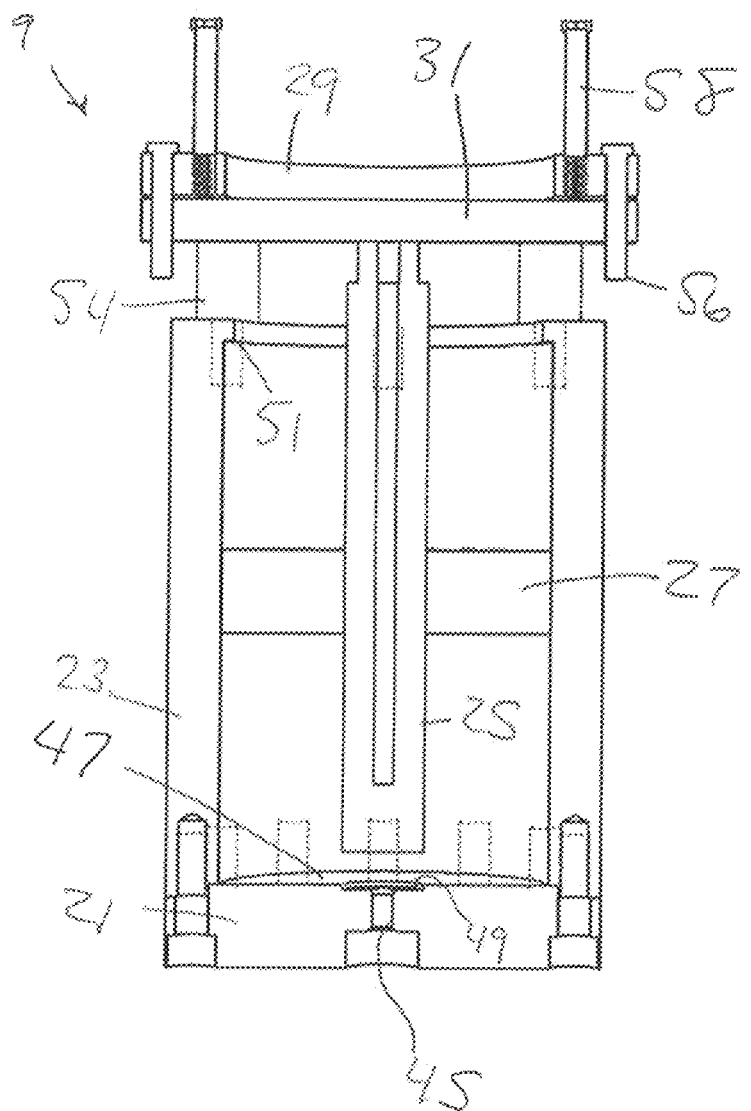
FIG. 6 is a view similar to FIG. 5 showing the mold plunger advanced upward approximately half the length of the core.

Referring to FIGS. 3-7, the flange plate 21 is bolted to and extends across a lower or inlet end of the mold sidewall 23. As best seen in FIG. 6, the inner surface 47 of the flange plate 21 is generally planar except for a recess 49 formed around the inlet 45 extending therethrough. The inner surface of the sidewall 23 is smooth except for an inwardly projecting lip or shoulder 51 formed on the sidewall 23 in longitudinally spaced relation from the inlet end and preferably at an upper or distal end thereof. In the embodiment shown, the sidewall 23 is cylindrical, but it is foreseen that it could be formed in other shapes including square or triangular.

The axial core 25 is supported axially within the sidewall 23 and generally held in its axial alignment by the plunger 27 which extends around the core 25 and in abutting relationship with both the outer surface of the core 25 and the inner surface of the sidewall 23. An inner diameter of the shoulder 51 is narrower than a diameter of the plunger 27 such that the plunger 27 is retained in the mold cavity 24 by the shoulder 51 on the distal end of the sidewall 23 and by the flange plate 21 extending across the inlet end of the sidewall 23.

Figure 2:
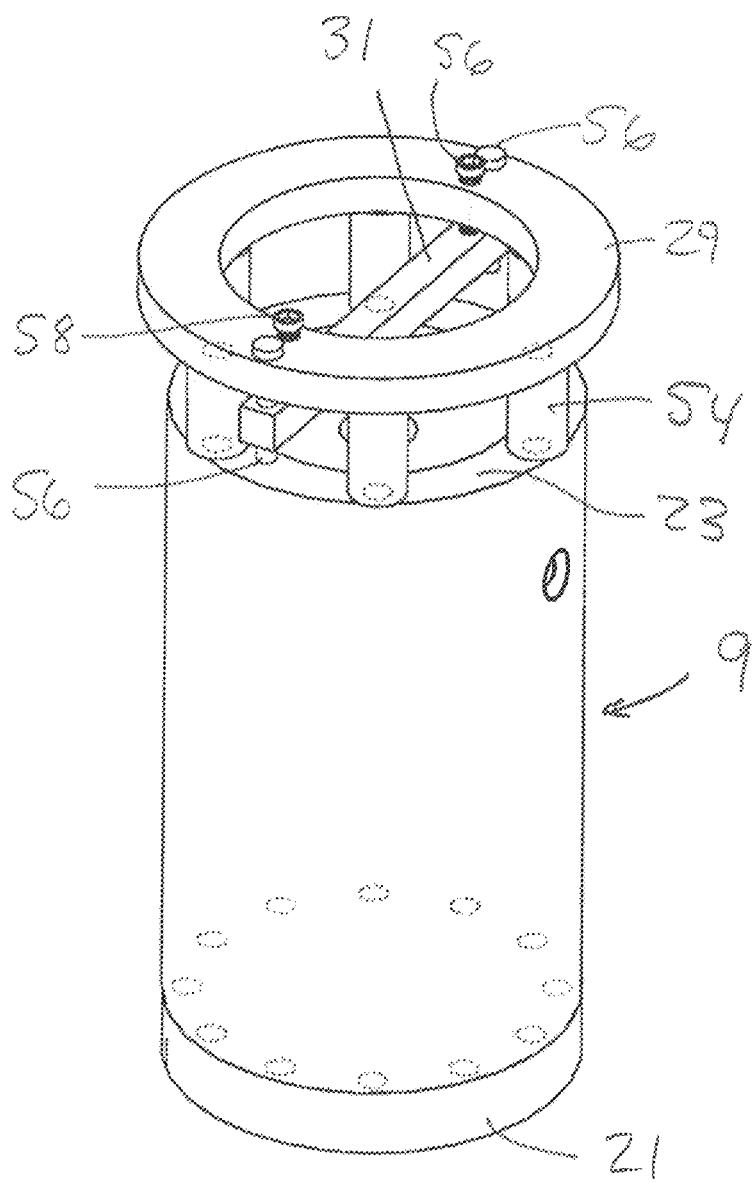
FIG. 2 is a perspective view of a mold of the type shown supported on the movable platen of FIG. 1.
Figure 3:
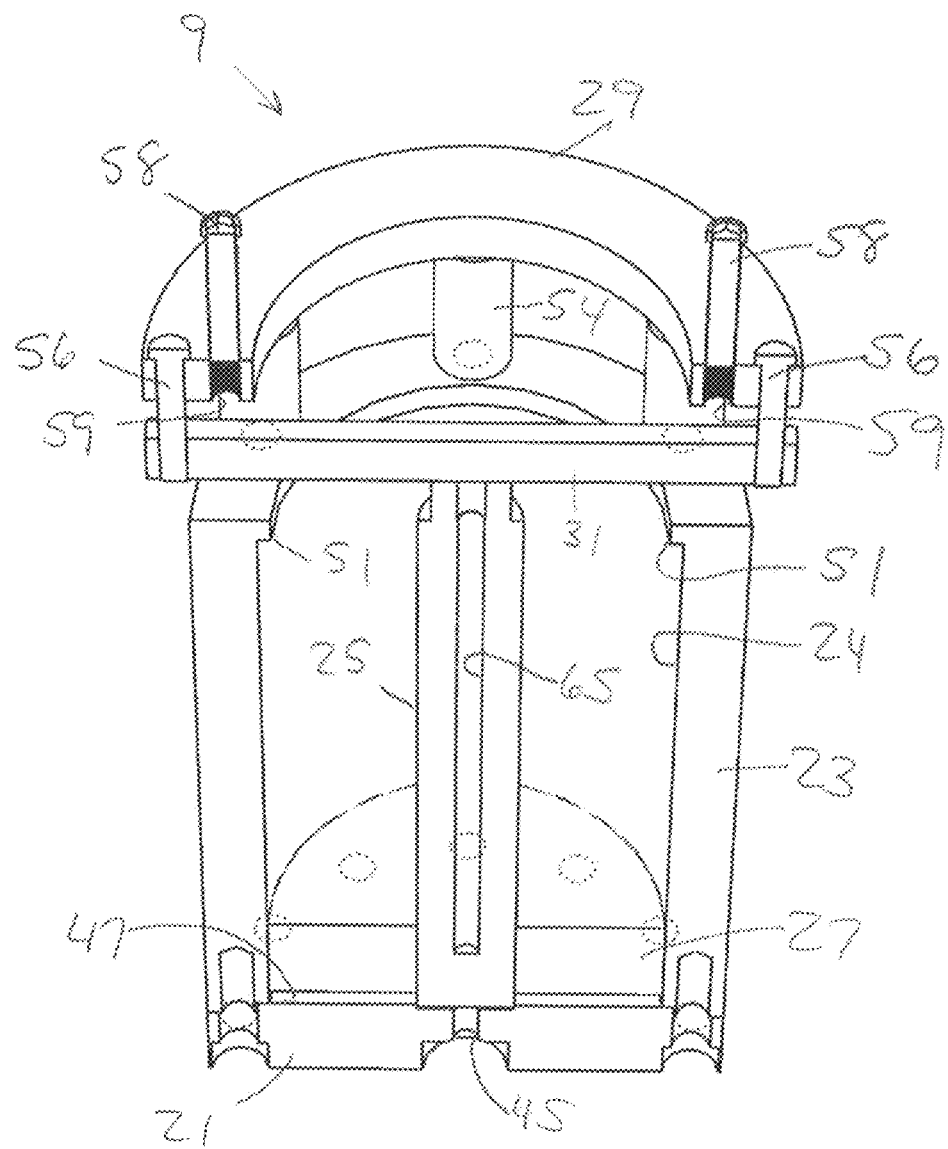
FIG. 3 is a perspective, cross-sectional view of the mold as shown in FIG. 2 showing an axial core seated against a flange plate and a plunger supported just above the upper surface of the flange plate prior to injection of plasticized material therein.
Figure 4:
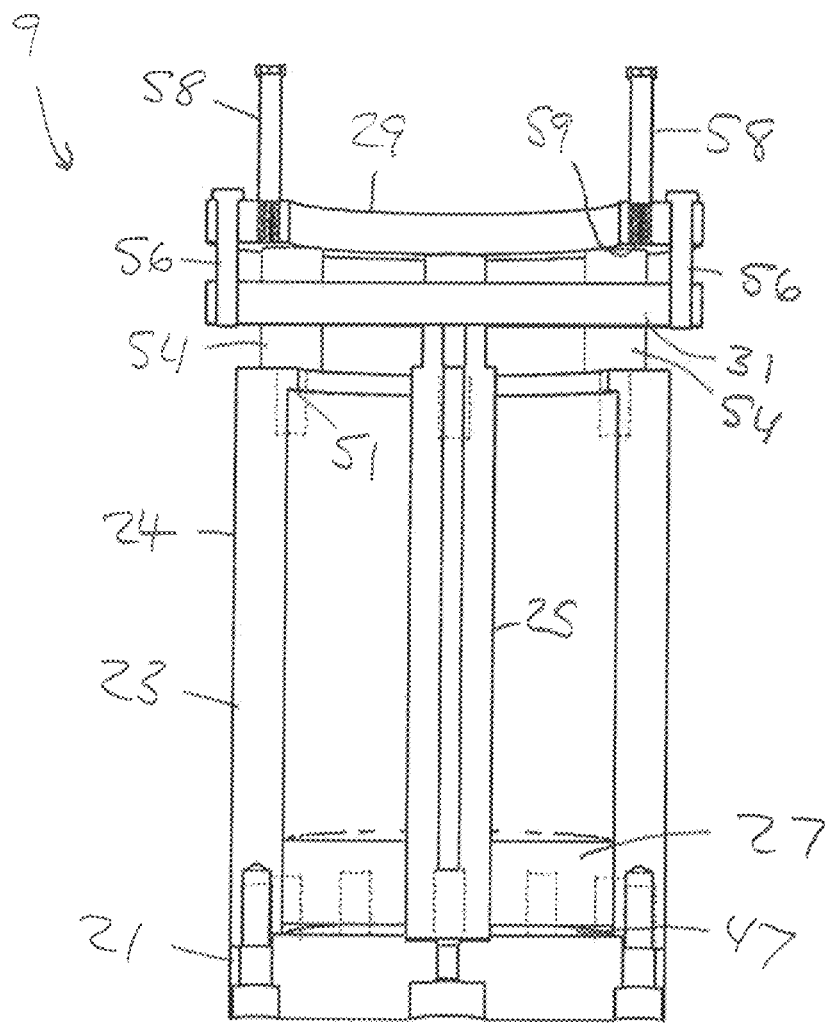
FIG. 4 is an elevational, cross-sectional view of the mold as shown in FIG. 3.

The annular top plate 29 may be secured to and spaced above or outward from the distal end of the mold sidewall 23 by bolts (not shown) surrounded by spacers 54 formed from insulating material such as ceramic or mica. Ends of the core stop 31, which in the embodiment shown is formed as a bar, are slidably mounted on guide pins 56 extending through and depending from opposite sides of the annular top plate 29. The center of the core stop 31 rests on top of an upper end of the axial core 25. When the mold cavity 24 is empty, prior to injection of plastic therein and as shown in FIGS. 2 and 3, the weight of the core stop 31 and the axial core 25 holds the axial core 25 against the flange plate 21 and seated within the recess 49. When plasticized material is injected into gate 45 and as generally shown in FIG. 5, the pressurized flow of plastic urges the axial core 25 upward away from the flange plate 21 so that the plastic flows into the mold cavity 24 around the axial core 25.

Figure 7:
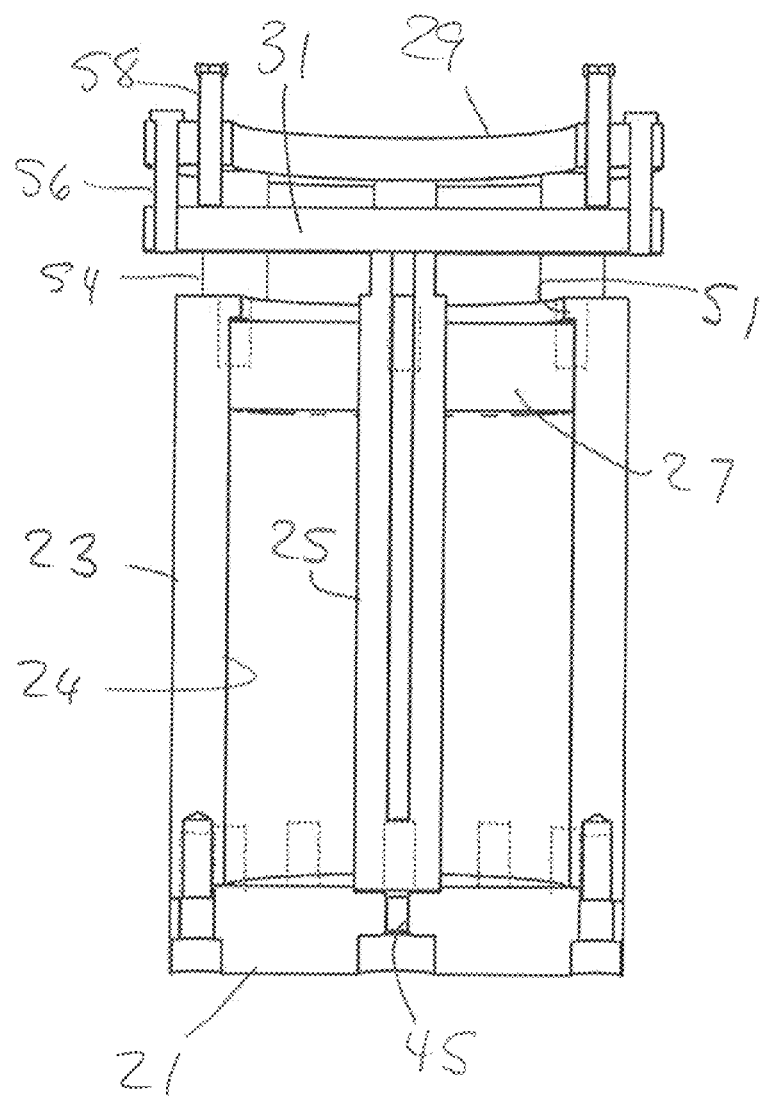
FIG. 7 is a view similar to FIG. 6 showing the plunger advanced upward near the upper end of the mold cavity in close proximity to a shoulder formed on the inner surface of the mold sidewall.

Upward movement of the axial core 25 is limited to a distance equal to the gap between the upper surface of the core stop 31 and the bottom surface of the annular top plate 29. The core stop 31 will only allow the axial core 25 to rise until the core stop 25 abuts against the top plate 29. The gap may be narrowed using set screws 58 extending through threaded bores 59 in the top plate 29. Two set screws 58 are used and the threaded bores 59 for the set screws 58 are formed on opposite sides of the top plate 29 in alignment with the guide pins 56. As shown in FIG. 7, the set screws 58 are also used to draw the core stop 31 and the core 25 downward and hold the lower end of the core 25 seated within the recess 49 in the flange plate 21 which prevents plastic from flowing into or out of the mold cavity 24 through the gate 45 in the flange plate 21.

The components of the mold forming the mold cavity, sidewall 23, flange plate 21, axial core 25 and plunger 27, are formed from a heat conducting material such as steel or other metals including metal allows. Heaters (not shown) are connected to components of the mold forming the mold cavity 24 and controlled to heat the components prior to injection of plastic therein. For example, band heaters may be secured or connected to the outer, circumferential surface of the mold sidewall 23 and the mold flange plate 21 respectively for heating these components. In addition, a cartridge heater (not shown) may be inserted ion a bore 65 in the axial core 25. The mold plunger 27 is heated through conduction through the mold sidewall 23 and the core 25. It is foreseen that heaters could be connected to the plunger 27 through the upper end of the mold.

In one molding process, using the molding system 1 shown, the empty mold 9 is oriented vertically with the annular top plate 29 extending above the mold sidewall 23 which extends above the flange plate 21. The set screws 58 are drawn upward, if necessary, to provide a gap between an upper surface of the core stop 31 and the tips of the set screws 58 corresponding to the desired vertical movement of the axial core 25 within the mold cavity 24. The gap is selected to permit the axial core 25 to slide upward far enough to create a space between the bottom of the core 25 and the flange plate 21 through which plasticized material may flow. Before plasticized material is injected into the mold 9, the axial core 25 and plunger 27 slide downward by gravity so that the lower end of core 25 is seated in the flange plate recess 49. A stop or shoulder (not shown) which may be formed on an upper or inner surface of the flange plate 21 proximate an inner surface of sidewall 23 creates a gap between the bottom surface of the plunger 27 and an upper surface of the flange plate 21 at least near the axial guide.

Prior to injection of plastic material into the mold cavity 23, the mold sidewall 23, flange plate 21, axial core 25 and plunger are heated to a temperature that is above the injection temperature of the plastic material injected into the mold 9. Plastic pellets or powders are preheated in the extruder 5 and then injected into the mold cavity 24 through inlet passageway 39 in base 17 and gate 45 in flange plate 21. Once the plastic pellets or powder are preheated to an injection temperature, the valve 43 in base 17 is opened and the extruder is operated to inject plasticized material into the mold cavity 24 through the inlet passageway 39 in base 17 and gate 45 in flange plate 21.

Plastic injected into the mold cavity through gate 45 initially pushes the axial core 25 upward out of seating relationship in the recess 49 of flange plate 21. The plastic material then enters the gap between the flange plate 21 and the bottom surface of the plunger 27 to push against the bottom surface of the plunger 27 and move the plunger 27 upward and away from the flange plate 21. The plunger 27 is displaced vertically in proportion to the amount of plasticized material injected into the mold cavity 24. The weight of the plunger 27 results in relatively uniform distribution of plasticized material throughout the mold cavity 24.

Once enough plasticized material has been injected into the mold cavity 24 to create a tube of a desired height or length, valve 43 in base 17 is closed. The set screws 58 are then tightened or threaded downwardly to push the core stop 31 and the axial core 25 downward until the lower end of the axial core 25 extends into recess 49 and seats against the flange plate 21 cutting off any flow of material into or out of the mold cavity. The extruder 5 is separated from the mold 9 and the mold 9 and its contents are allowed to cool until the injected material solidifies sufficient to permit displacement of the molded part from the mold 9 without deforming the molded part. The molded part may be removed from the mold 9 by first separating the flange plate 21 from the mold sidewall 23 and then pressing on the plunger from the upper end of the mold 9.

While the molded part is cooling in the first mold 9, a second mold 9 in a second mold press 7 may be preheated to a desired temperature and then the extruder connected thereto for forming a second molded part. Multiple molds 9 and mold presses 7 may be utilized as it generally takes longer to cool a molded part than it does to preheat and then inject into another mold 9.

Referring to FIG. 8, in an alternative molding process of the present invention, inserts 71 may be inserted into the mold cavity 24 prior to injection of plastic material therein to be integrated into the molded part. The inserts 71, may for example, be formed from woven carbon fiber mats which increase the tensile strength of the molded part. A core insert 73 formed as a sleeve, may be sized for insertion over the axial core 25. A sidewall insert 75 formed as a larger diameter sleeve, may be sized to slide just inside the inner surface of the sidewall 23. Inner end insert 77 may be formed as an annular disc and slid over the axial core 25 and supported on the upper surface of the flange plate 21 within sidewall 23. An outer or upper end insert 79 may be formed as an annular disc and adhered to a lower surface of the plunger 27 and around the axial core 25.

If either a core insert 73 or sidewall insert 75 is used, the plunger 27 is preferably held at an upper end of the mold cavity 24, suspended from a heater plate or possibly the top plate 29, while plastic is injected into the mold cavity, due to the interference created by the inserts 73 and 75 with the movement of plunger 27.

Figure 9:
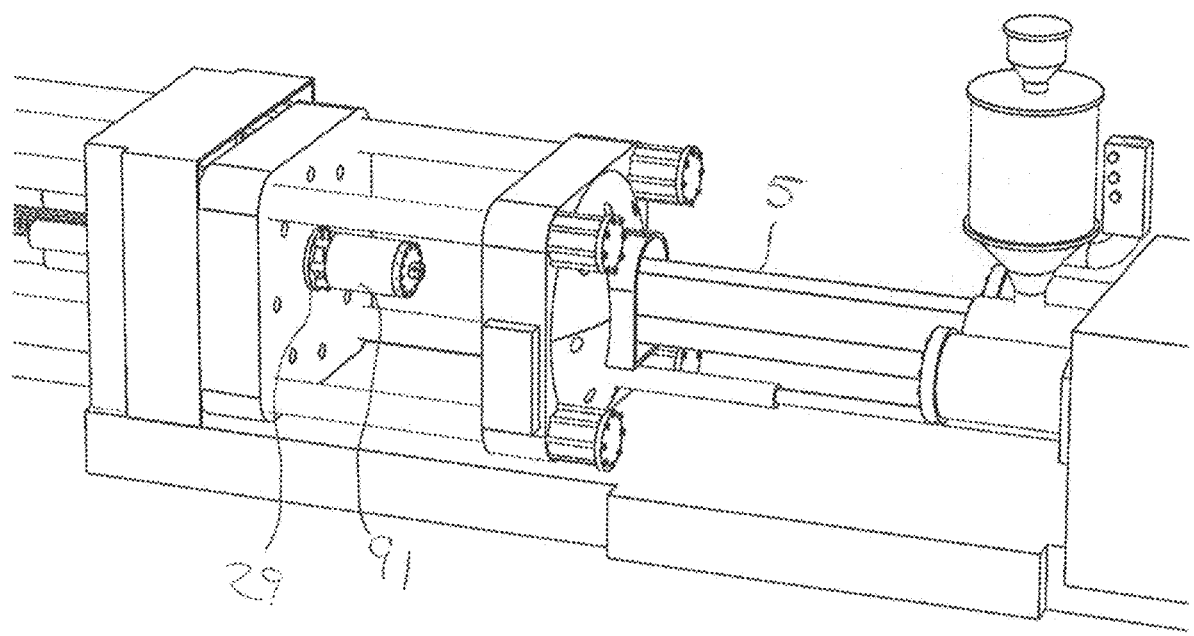
FIG. 9 is a perspective view of a horizontally oriented mold press and mold connected to an extruder.

As shown in FIG. 9, it is foreseen that the mold 9 could be oriented with the longitudinal axis of the mold 9, the mold cavity 24 and axial core 25 extending horizontally. The mass of the plunger 27 and friction between the plunger 27 and the core 25 and inner surface of sidewall 23 function to aid in dispersing plasticized material throughout the mold cavity as the injected plasticized material displaces the plunger 27 horizontally from proximate the flange plate 21 toward the shoulder 51 on the outer end of the mold 9. Similarly, inserts 71 could be used with the longitudinal axis of the mold oriented horizontally.

FIGS. 10-13 show alternative embodiments of the mold 9 each having a variable dimension mold cavity. Parts common to the embodiment shown in FIG. 1 and FIGS. 10-13 may be referred to with common reference numbers. In the mold 101 shown in FIG. 10, the mold cavity 103, defined by mold sidewall 104, is formed in two sections, a first section 106 located proximate the end wall 21 and a second section 108 closer to the annular top plate 29. The second section 108 is narrower in diameter than the first section 106 and a shoulder 109 is formed in the mold sidewall 104 at the transition between the first and second sections 106 and 108. Annular plunger 110, is sized just smaller in diameter than the inner diameter of the second section 108 of mold cavity 103 so that it can slide along the axial core 25 from the first section 106 through the second section 108.

Figure 10:
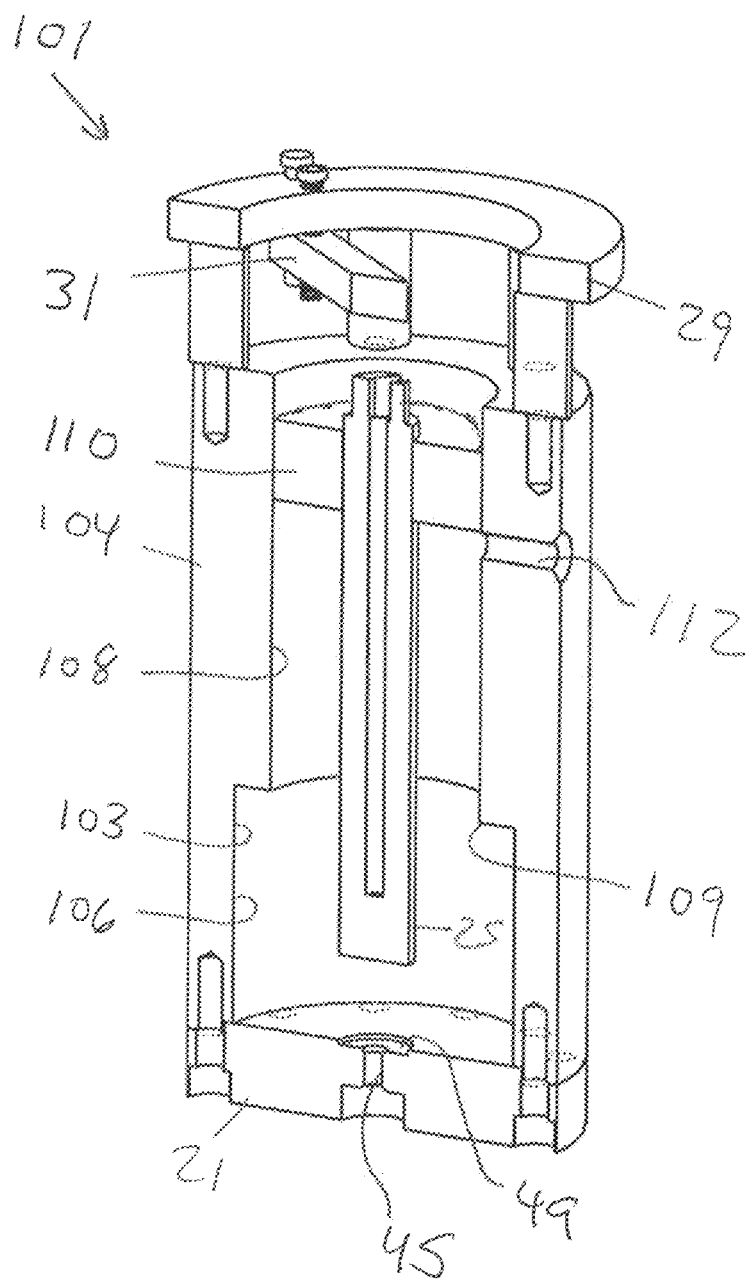
FIG. 10 is a cross-sectional view of an alternative embodiment of a mold as in FIG. 3 with a modified mold cavity and plunger.

An alternative fill hole or inlet 112 is shown in the mold sidewall 104 in communication with the second section 108 of the mold cavity 103 proximate an upper end thereof (with respect to the orientation of the mold 101 as shown in FIG. 10). Plasticized material may be injected into the mold cavity 103 through alternative inlet 112, in which case the plunger 110 would be supported above the inlet 112 during filling. After the mold cavity 103 was filled with a desired volume of plasticized material, the annular plunger 110 would then be released so that the weight of the plunger 110 would press downward on and compress the plasticized material during curing.

Figure 11:
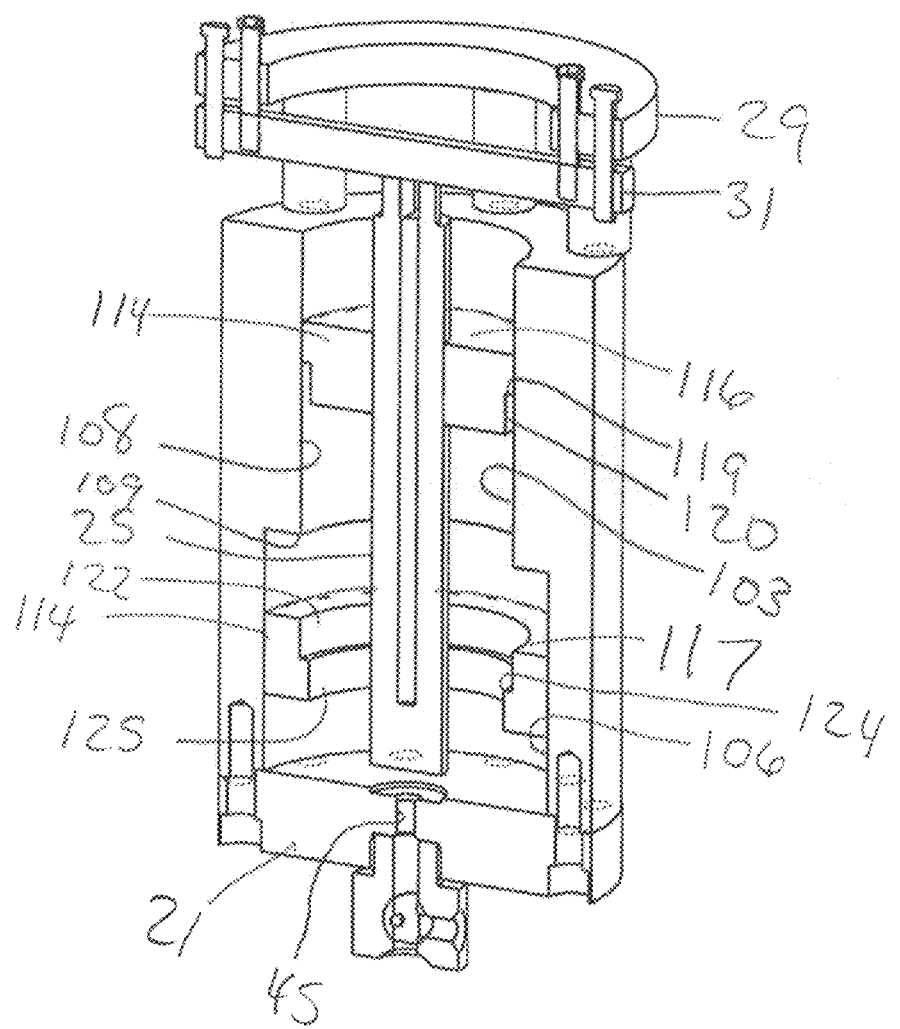
FIG. 11 is a cross-sectional view of the mold as in FIG. 10 with a modified, two piece plunger.

In the embodiment shown in FIG. 11, a two-part plunger 114 including inner plunger section 116 and outer plunger section 117 is shown positioned within the mold cavity 103 and around axial core 25. The inner plunger section 116 is slidably secured on the axial core 25 with an inner diameter of inner plunger section 116 slightly larger than the outer diameter of the axial core 25. An outer diameter of the inner plunger section 116 is slightly narrower than the inner diameter of the narrower, second section 108 of the mold cavity 103. A lower portion of the inner plunger section 116 is inwardly recessed to form a downwardly facing shoulder 119 on an outer surface 120 of the inner plunger section 116.

The outer diameter of the outer plunger section 117 is slightly narrower than the inner diameter of the lower, first section 106 of the mold cavity 103. The outer plunger section 117 is annular and includes a central bore or opening 122 extending therethrough. A lower portion of the outer plunger section 117 is wider than an upper section to form an upwardly facing shoulder 124 on an inner surface 125 of the outer plunger section 117. The inner surface 125 of the outer plunger section 117 has a mating geometry with the outer surface 120 of the inner plunger section 116 such that the inner plunger section 116 nests within the outer plunger section 117.

The inner and outer plunger sections 116 and 117 are weighted so as to rest on the mold end wall 21 prior to filling of the mold cavity 103 through central inlet 45. Upon filling of the mold cavity 103 through inlet 45, the introduced molten plastic initially lifts both the inner and outer plunger sections 116 and 117 within the wider, first section 106 of the mold cavity 103 until the outer plunger section 117 abuts against shoulder 109 in mold sidewall 104 at the upper end of the lower section 106. As additional molten plastic is introduced into the mold cavity 103 through inlet 35, the inner plunger section 116 separates from and continues to move upward along the axial core 25 and within the upper, second section 108 of the mold cavity 103 until the cavity is filled or when the inner plunger section 116 abuts a stop (not shown) at the upper end of the mold cavity 103.

Figure 12:
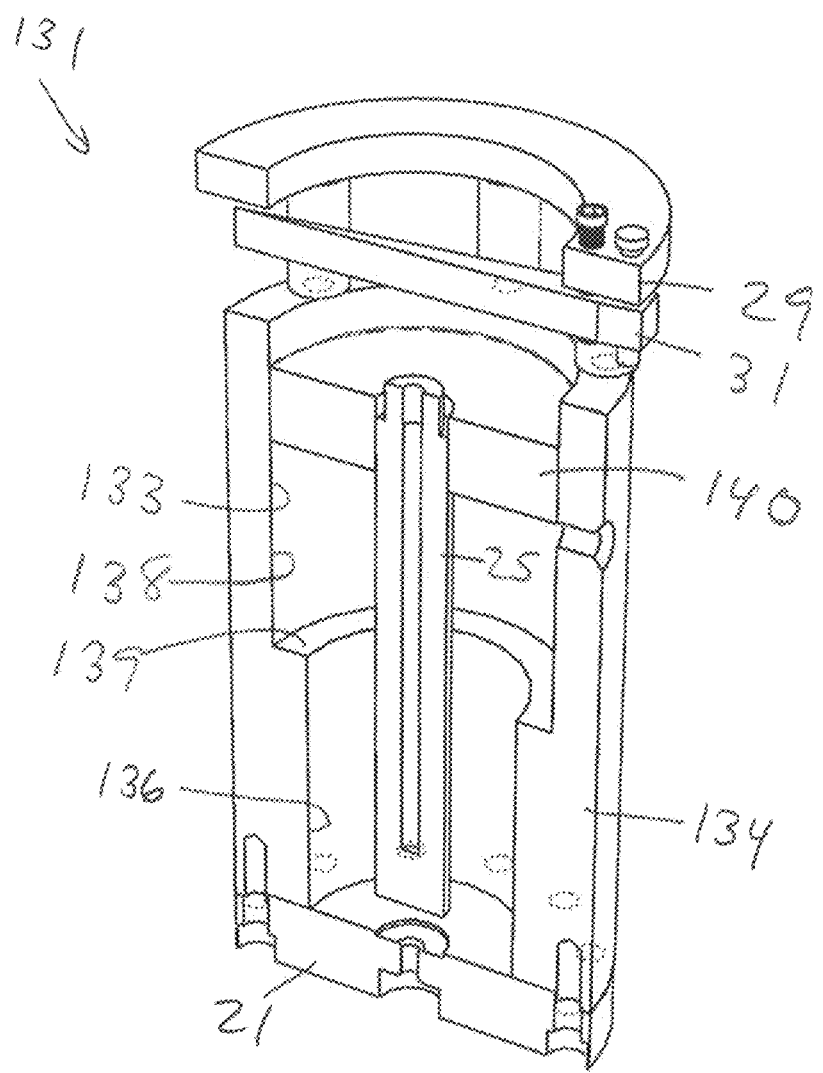
FIG. 12 is a cross-sectional view of an alternative embodiment of a mold as in FIG. 3 with a modified mold cavity.

In alternative mold 131 shown in FIG. 12, a modified mold cavity 133, defined by mold sidewall 134, is formed in two sections, a first section 136 located proximate the end wall 21 and a second section 138 closer to the annular top plate 29. The second section 138 is shown as wider in diameter than the first section 136 and a shoulder 139 is formed in the mold sidewall 134 at the transition between the first and second sections 136 and 138. Annular plunger 140, is sized just smaller in diameter than the inner diameter of the second section 138 of mold cavity 133 so that it can slide along the axial core 25 from the shoulder 139 through the second section 138 of the mold cavity 133.

Figure 13:
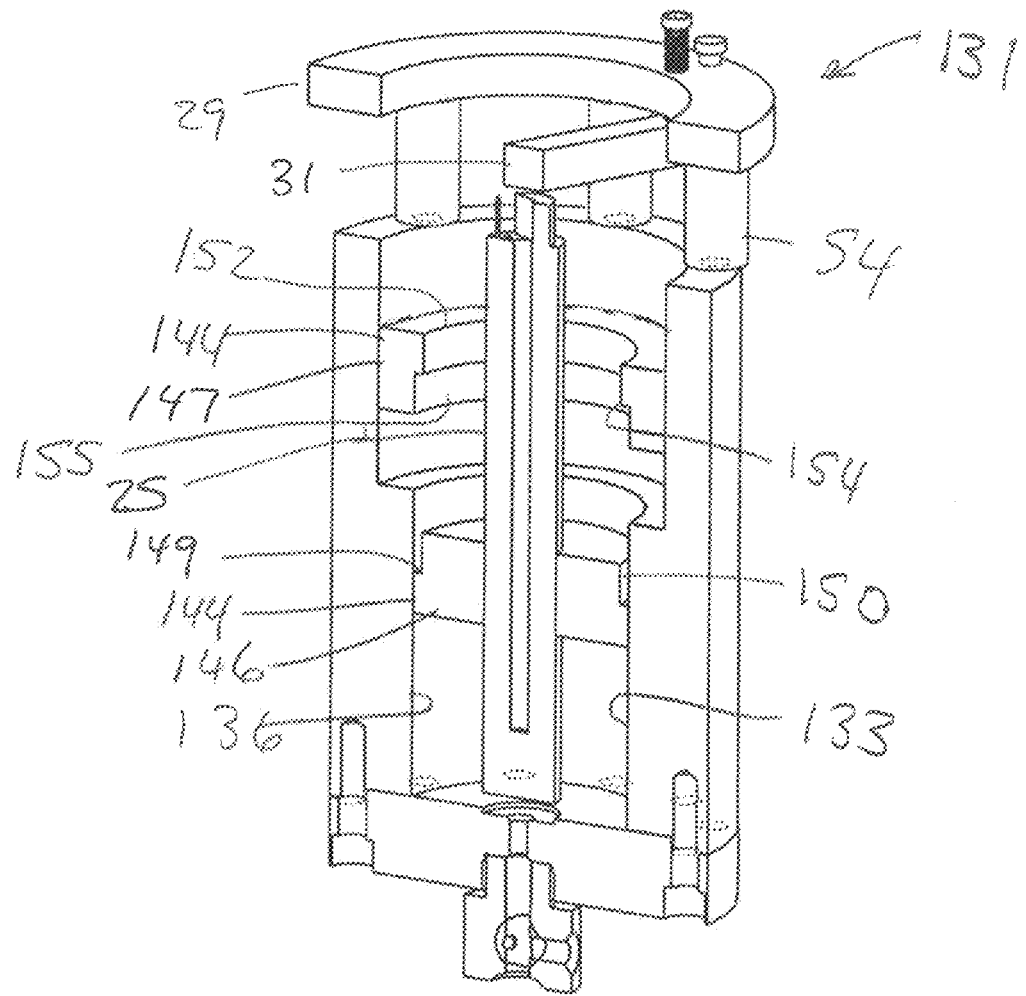
FIG. 13 is a cross-sectional view of the mold as in FIG. 12 with a modified, two piece plunger.

In the embodiment shown in FIG. 13, a two-part plunger 144 including inner plunger section 146 and outer plunger section 147 is shown positioned within the mold cavity 133 and around axial core 25. The inner plunger section 146 is slidably secured on the axial core 25 with an inner diameter of inner plunger section 146 slightly larger than the outer diameter of the axial core 25. An outer diameter of the inner plunger section 146 is slightly narrower than the inner diameter of the narrower, first section 136 of the mold cavity 133. An upper portion of the inner plunger section 146 is inwardly recessed to form an upwardly facing shoulder 149 on an outer surface 150 of the inner plunger section 146.

The outer diameter of the outer plunger section 147 is slightly narrower than the inner diameter of the upper, second section 138 of the mold cavity 133. The outer plunger section 147 is annular and includes a central bore or opening 152 extending therethrough. A lower portion of the outer plunger section 147 is narrower than an upper section to form a downwardly facing shoulder 154 on an inner surface 155 of the outer plunger section 147. The inner surface 155 of the outer plunger section 147 has a mating geometry with the outer surface 150 of the inner plunger section 146 such that the inner plunger section 146 nests within the outer plunger section 147.

The inner and outer plunger sections 146 and 147 are weighted so that the inner plunger section 146 initially rests on the mold end wall 21 prior to filling of the mold cavity 133 through central inlet 35 and the outer plunger section 147 initially rests on the shoulder 139 of the mold sidewall 134 prior to filling of the mold cavity 133 through inlet 35. Upon filling of the mold cavity 133 through inlet 35 the introduced molten plastic initially lifts the inner plunger section 146 within the narrower, first section 136 of the mold cavity 133 until the upwardly facing shoulder 140 on inner plunger section 146 is lifted into abutment against downwardly facing shoulder 154 in outer plunger section 147. As additional molten plastic is introduced into the mold cavity 133 through inlet 35, the inner plunger section 146 and the outer plunger section 147 move upward together along the axial core 25 and within the upper, second section 138 of the mold cavity 133 until the cavity is filled or when the outer plunger section 147 abuts a stop (not shown) at the upper end of the mold cavity 133.

Figure 14:
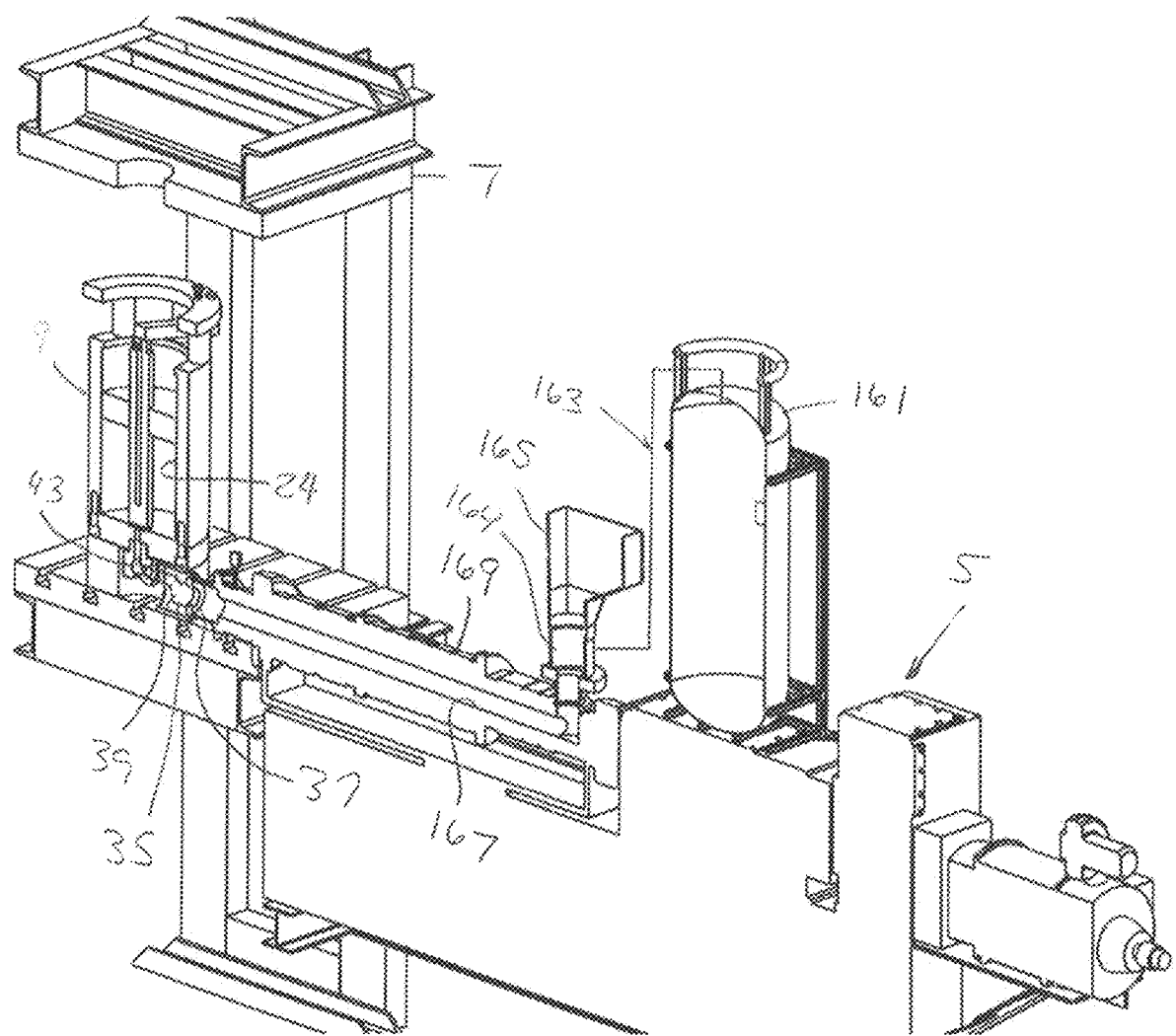
FIG. 14 is a partially schematic, cross-sectional view of a modified version of the molding system as shown in FIG. 1 having a gas canister associated with and flow connected with the extruder through a purging gas supply line.

FIG. 14 is a partially schematic, cross-sectional view of a modified version of the molding system 1 having an inert gas canister 161 associated with and flow connected with the extruder 5 through supply line 163. More specifically, the supply line 163 may be connected to an outlet 164 from a feed hopper 165 for supplying the plastic material to the bore 167 in the extruder barrel 169. The extruder 5 will typically be of a type having one or two screws for advancing and melting plastic feed material from the hopper 165 to the extruder nozzle 37 and then into injecting the plasticized material into the mold cavity 24. The gas canister 161 and feed hopper 165 are preferably mounted on the extruder 5.

The supply line 163 can be connected to the extruder 5 so that inert gas can be directed into the feed hopper 165 and the bore 167 of the extruder barrel 169 for purging ambient air therefrom and drying the plastic feed material prior to advancement of the plasticized plastic feed material out the extruder nozzle 37, into and through the inlet 35 and inlet passageway 39 in the mold base 17, through valve 43, through gate 45 end wall 21 and into the mold cavity 24. Nitrogen gas may be used as the inert gas to displace from the extruder barrel 169 and hopper 165 or dilute the ambient air therein to thereby reduce the overall oxygen content or water vapor content of the plasticized feed material that is injected into the mold cavity 24. Reduction or elimination of oxygen and water vapor in the mold cavity is desirable to reduce adverse reactions with the molten plastic therein. It is foreseen that a wide variety of gasses could be used as the purging gas to reduce the amount of oxygen or water vapor in the mold cavity 24 or to provide other benefits or reactions during the molding process including any of the noble gasses.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

Having thus described the invention, what is claimed as new and desired to be secured by Letters Patent is as follows:

1. A method of forming a molded item comprising the steps of:
   providing a mold having a mold sidewall surrounding a mold cavity and an open end opening into the mold cavity
   inserting into the mold cavity through the open end thereof a first sleeve formed from a material adapted to increase the tensile strength of the molded part, wherein the first sleeve has a shape corresponding to the shape of an inner surface of the mold sidewall;
   after inserting the first sleeve into the mold cavity, introducing plasticized material into the mold cavity until the mold cavity is filled with plasticized material to an extent extending proximate the open end of the mold;
   covering the contents of the mold cavity with a cover extending at least substantially across the open end of the mold cavity;
   applying a force to the cover to press the cover against the contents of the mold cavity to form the molded item with the first sleeve integrated into the molded item.

2. The method as in claim 1 wherein:
   the step of providing a mold includes providing a mold having an inlet end wall extending across an inlet end of the outer wall and said inlet end wall having a material inlet passageway formed therein and through which plasticized material may be introduced into the mold cavity;

the step of introducing plasticized material into the mold cavity comprises introducing plasticized material into the mold cavity through the material inlet passageway; and wherein the cover comprises a plunger having a cross-section, sized and shaped to correspond to the cross-section of the open end of the mold so that the plunger may extend at least partially into the open end of the mold.

3. The method as in claim 1 wherein the step of providing the mold further comprises providing a mold having an inlet end wall opposite the open end of the mold with a material inlet passageway extending through the inlet end wall and providing a core slidably mounted within the mold cavity so that the core is slidable axially relative to the mold sidewall between a seated position in which an inlet end of the core is seated against an inner surface of the inlet end wall and across the material inlet passageway preventing molten thermoplastic from flowing into the mold cavity through the material inlet passageway and a retracted position in which said inlet end of the sliding core is spaced away from the inner surface of the inlet end wall allowing plasticized material to flow into said mold cavity through said material inlet passageway; and the method further comprises, prior to introducing plasticized material into the mold cavity, inserting into the mold cavity through the open end thereof and around the core an inner sleeve formed from a material adapted to increase the tensile strength of the molded part.

4. A method of forming a molded item comprising the steps of:

providing a mold having a mold sidewall surrounding a mold cavity and a material inlet passageway extending through the mold into the mold cavity;

flow connecting an outlet nozzle of an extruder to the material inlet passageway of the mold; the extruder having an extruder barrel with a bore extending therethrough in communication with the outlet nozzle and through which a plastic material may be advanced form the barrel and out the nozzle of the extruder and into the material inlet passageway of the mold as a plasticized material;

connecting a source of a gas to the extruder and purging ambient air from the bore of the extruder by directing a quantity of gas from the source of the gas into the bore of the extruder in association with the advancement of plastic material into the bore of the extruder prior to injection of plasticized material into the mold cavity.

5. The method as in claim 4 wherein the gas comprises a gas that does not react with the plasticized material.

6. The method as in claim 4 wherein the gas comprises Nitrogen.

7. The method as in claim 4 wherein the step of connecting a source of a gas to the extruder comprises connecting the source of gas to an outlet from a feed hopper for supplying the plastic material to the extruder barrel.

8. The method as in claim 4 wherein the step of providing a mold includes providing a mold having an open end opening into the mold cavity and the method further comprises:

inserting into the mold cavity through the open end thereof a first sleeve formed from a material adapted to increase the tensile strength of the molded part, wherein the first sleeve has a shape corresponding to the shape of an inner surface of the mold sidewall;

after inserting the first sleeve into the mold cavity, introducing plasticized material into the mold cavity until the mold cavity is filled with plasticized material to an extent extending proximate the open end of the mold;

covering the contents of the mold cavity with a cover extending at least substantially across the open end of the mold cavity;

applying a force to the cover to press the cover against the contents of the mold cavity.

9. The method as in claim 8 wherein:

the step of providing a mold includes providing a mold having an inlet end wall extending across an inlet end of the outer wall and said inlet end wall having a material inlet passageway formed therein and through which plasticized material may be introduced into the mold cavity;

the step of introducing plasticized material into the mold cavity comprises introducing plasticized material into the mold cavity through the material inlet passageway; and wherein the cover comprises a plunger having a cross-section, sized and shaped to correspond to the cross-section of the open end of the mold so that the plunger may extend at least partially into the open end of the mold.

10. The method as in claim 8 wherein the step of providing the mold further comprises providing a mold having an inlet end wall opposite the open end of the mold with a material inlet passageway extending through the inlet end wall and providing a core slidably mounted within the mold cavity so that the core is slidable axially relative to the mold sidewall between a seated position in which an inlet end of the core is seated against an inner surface of the inlet end wall and across the material inlet passageway preventing molten thermoplastic from flowing into the mold cavity through the material inlet passageway and a retracted position in which said inlet end of the sliding core is spaced away from the inner surface of the inlet end wall allowing plasticized material to flow into said mold cavity through said material inlet passageway; and the method further comprises, prior to introducing plasticized material into the mold cavity, inserting into the mold cavity through the open end thereof and around the core an inner sleeve formed from a material adapted to increase the tensile strength of the molded part.

* * * * *